US010908317B2

(12) United States Patent
Gou et al.

(10) Patent No.: US 10,908,317 B2
(45) Date of Patent: Feb. 2, 2021

(54) METHOD FOR EXPERIMENTALLY DETERMINING CONDUCTIVITY DISTRIBUTION OF ACID-FRACTURED FRACTURE OF CARBONATE ROCK OIL AND GAS RESERVOIR

(71) Applicant: SOUTHWEST PETROLEUM UNIVERSITY, Chengdu (CN)

(72) Inventors: Bo Gou, Chengdu (CN); Jianchun Guo, Chengdu (CN); Chi Chen, Chengdu (CN); Jichuan Ren, Chengdu (CN); Jie Lai, Chengdu (CN); Xiao Li, Chengdu (CN); Bo Yang, Chengdu (CN)

(73) Assignee: SOUTHWEST PETROLEUM UNIVERSITY, Chengdu (CN)

( * ) Notice: Subject to any disclaimer, the term of this patent is extended or adjusted under 35 U.S.C. 154(b) by 426 days.

(21) Appl. No.: 16/069,888

(22) PCT Filed: Nov. 2, 2017

(86) PCT No.: PCT/CN2017/109019
§ 371 (c)(1),
(2) Date: Jul. 13, 2018

(87) PCT Pub. No.: WO2018/121046
PCT Pub. Date: Jul. 5, 2018

(65) Prior Publication Data
US 2019/0033488 A1   Jan. 31, 2019

(30) Foreign Application Priority Data
Dec. 26, 2016 (CN) .......................... 2016 1 1218306

(51) Int. Cl.
*G01V 99/00*   (2009.01)
*C09K 8/72*   (2006.01)
(Continued)

(52) U.S. Cl.
CPC .............. *G01V 99/005* (2013.01); *C09K 8/72* (2013.01); *E21B 43/26* (2013.01); *G01N 15/082* (2013.01); *E21B 47/07* (2020.05); *E21B 49/00* (2013.01)

(58) Field of Classification Search
CPC ...... G01V 99/005; G01N 15/082; C09K 8/72; E21B 43/26
See application file for complete search history.

(56) References Cited

U.S. PATENT DOCUMENTS 6,749,022 B1 * 6/2004 Fredd ....................... C09K 8/72
166/250.1
10,100,245 B1 * 10/2018 Bulekbay ................. C09K 8/68
(Continued)

FOREIGN PATENT DOCUMENTS

CN       101864949 A    10/2010
CN       103577886 A     2/2014
(Continued)

OTHER PUBLICATIONS

Yingchuan Li, Oil Production Engineering (Second Edition), Beijing: Petroleum Industry Press, 278-279.
(Continued)

*Primary Examiner* — Bijan Mapar
(74) *Attorney, Agent, or Firm* — Bayramoglu Law Offices LLC

(57) ABSTRACT

The present invention discloses a method for experimentally determining the conductivity distribution of an acid-fractured fracture a carbonate rock oil and gas reservoir, including the following steps: by an acid fracturing simulator FracproPT, simulating and acquiring distribution data of fracture width, fracture height, temperature and acid liquor mass concentration in a hydraulic fracture length direction; selecting fracture width, fracture height and temperature data of total 10 feature points with the acid liquor mass concentrations being from 100% to 10% of the initial mass concentration; converting site acid injection displacement into laboratory acid injection displacement; preparing experimental acid liquor according to the acid liquor mass concentration data of the 10 feature points; and simulating (Continued)

the acid etching process, and experimentally testing the conductivity under the condition of reservoir closed pressure, and drawing a distribution diagram of the acid-etched fracture conductivity in the fracture length direction under the reservoir condition.

5 Claims, 3 Drawing Sheets

(51) Int. Cl.
*E21B 43/26* (2006.01)
*G01N 15/08* (2006.01)
*E21B 47/07* (2012.01)
*E21B 49/00* (2006.01)

(56) References Cited

U.S. PATENT DOCUMENTS

| | | | |
|---|---|---|---|
| 2014/0212006 A1* | 7/2014 | Zhao | G06T 7/0004 |
| | | | 382/109 |
| 2015/0083420 A1 | 3/2015 | Gupta et al. | |
| 2019/0128111 A1* | 5/2019 | Pandey | H03M 7/30 |
| 2019/0300779 A1* | 10/2019 | Yu | C09K 8/90 |
| 2020/0300082 A1* | 9/2020 | Liu | G06F 30/28 |

FOREIGN PATENT DOCUMENTS

| | | |
|---|---|---|
| CN | 103806890 A | 5/2014 |
| CN | 104747182 A | 7/2015 |
| CN | 105178939 A | 12/2015 |
| CN | 106522935 A | 3/2017 |

OTHER PUBLICATIONS

Wenzhi Zhao et al., Petroleum geological features and exploration prospect in deep marine carbonate strata onshore China: A further discussion Natural Gas Industry, 2014, 34(4): 1-9).

Chunming He at al., Detailed study on volume acid fracturing technology for fractured carbonate reservoirs, Petroleum & Natural Gas Chemical Industry, 2014, 534-538.

MJ Economides et al. Petroleum production systems, New York: Pearson Education International, 553-554.

\* cited by examiner

METHOD FOR EXPERIMENTALLY DETERMINING CONDUCTIVITY DISTRIBUTION OF ACID-FRACTURED FRACTURE OF CARBONATE ROCK OIL AND GAS RESERVOIR

CROSS REFERENCE TO RELATED APPLICATIONS

This application is the national phase entry of International Application No. PCT/CN2017/109019, filed on Nov. 2, 2017, which is based upon and claims priority to Chinese Patent Application No. 201611218306.X, filed on Dec. 26, 2016, the entire contents of which are incorporated herein by reference.

TECHNICAL FIELD

The present invention relates to a method for experimentally determining the conductivity distribution of an acid-fractured fracture of a carbonate rock oil and gas reservoir in the field of petroleum engineering. According to the method provided by the present invention, the conductivity of an underground acid-fractured fracture can be evaluated accurately by experimentally testing the conductivity distribution of the underground acid-fractured fracture in a fracture length direction, and the yield-increasing effect of the carbonate rock oil and gas reservoir during acid fracturing can be improved.

BACKGROUND

Marine carbonate rock oil and gas reservoirs are widely distributed in China, wherein there are 50 marine basins, with an exploration area of approximately $455 \times 10^4$ km$^2$, and the amount of oil and gas resources being $380 \times 10^8$ t oil equivalent. In recent years, large-medium-sized marine carbonate rock oil and gas fields have been successively discovered in the Sichuan Basin, the Ordos Basin and the Tarim Basin. At the end of the "11th Five-Year Plan" period, the cumulative proven rate was only 15%, demonstrating tremendous exploration and development prospects (Wenzhi Zhao, Suyun Hu, Wei Liu, et al, "Further Discussion on Geologic Feature and Exploration Prospect of Onshore Deep Marine Carbonate Rock Oil and Gas in China [J], Natural Gas Industry, 2014, 34(4): 1-9).

In China, the heterogeneity of marine carbonate rock reservoirs is extremely high, the development of oil and gas-rich reservoir bodies is discontinuous, and there is a low probability of direct communication between wellbore and oil and gas-rich reservoir bodies. Therefore, acid fracturing is an indispensable technical means for exploration and development (Chunming He, Bo Cai, Bangzhong Tang, et al, Fine Research on Acid Fracturing Technology in Fractured Carbonate Rock Reservoir [J], Petroleum & Natural Gas Chemical Industry, 2014:534-538).

Acid fracturing refers to a yield increasing technology in which acid liquor is injected to a reservoir under a pressure higher than a reservoir fracturing pressure and an acid-etched fracture is formed in the reservoir. Viscous preflush (a non-reactive fluid, such as a fracturing fluid) is generally adopted in the oil field site to fracture the reservoir to form a hydraulic fracture first, and then the acid liquor is injected into the hydraulic fracture. The acid liquor reacts with rock on the wall surface of the hydraulic fracture. Due to the heterogeneity of the acid-rock reaction, there is a difference in the reaction degree at different positions of the hydraulic fracture. After the fracture is closed, an unreacted region will serve as a support point to keep the fracture open, thus causing the acid-etched fracture to have certain conductivity. The acid-fracturing engineering design focuses on determining the effective acting distance of the acid liquor in the fracture length direction of the hydraulic fracture and the conductivity distribution formed by acid etching (M J Economides, A D Hill, C Ehlig-Economides, Ding Zhu. Petroleum production systems [M]. New York: Pearson Education International, 553-554).

Due to the inherent heterogeneity of the acid-etched hydraulic fracture, it is very difficult to determine the conductivity of the acid-etched fracture. The methods for determining the conductivity includes a numerical simulation method and an experimental evaluation method. The numerical simulation method adopts an empirical formula for correction, and thus has great uncertainty and low accuracy. The experimental method is the most direct method to acquire the conductivity of an acid-etched fracture, but is limited by the size of a current experimental rock sample (the current experimental rock sample: length (140-180) mm×width 38 mm×thickness (15-50) mm), and experimental results only reflect the conductivity near a wellbore and are thus difficult to reflect the conductivity in the entire fracture length direction. At present, there are no experimental methods to evaluate the conductivity distribution of an acid-etched fracture in the fracture length direction of a hydraulic fracture at home and abroad, which directly leads to the blindness in the selection of acid fracturing measures for carbonate rock reservoirs and in acid fracturing parameters, thereby affecting the acid fracturing effect and increasing the economic cost of acid fracturing.

SUMMARY

An objective of the present invention is to provide a method for experimentally determining the conductivity distribution of an acid fractured fracture of a carbonate rock oil and gas reservoir. This method is reliable in principle and easy to operate, achieves the conductivity testing of an acid-etched fracture in the entire fracture length direction, is conducive to the real evaluation of the conductivity distribution of an underground acid-fractured fracture and the improvement of the acid fracturing modification effect of the carbonate rock oil and gas reservoir, and has a broad market prospect.

To fulfill said technical objective, the present invention provides the following technical solution.

According to the present invention, down-hole acid-fractured fracture extending and acid etching processes during acid fracturing are simulated by adopting a common acid fracturing simulator FracproPT, and fracture width distribution, fracture height distribution, temperature distribution and acid liquor mass concentration distribution data in a hydraulic fracture length direction are acquired; in the hydraulic fracture length direction, fracture width, fracture height and temperature data of total 10 feature points with the acid liquor mass concentrations being 100%, 90%, 80%, 70%, 60%, 50%, 40%, 30%, 20%, 10% of the initial mass concentration are selected; acid injection displacement of the oil field site scale is converted into acid injection displacement of the laboratory scale according to a Reynolds number similarity criterion for fluid mechanics; acid liquor used for an experiment is prepared according to the acid liquor mass concentration data of the 10 feature points; and finally, the acid etching process is simulated according to the experimental condition parameters of the 10 feature points and the flow described in the patent ZL201010203373.0, the conductivity under the condition of reservoir closed pressure is experimentally tested, and a conductivity distribution diagram of an acid-etched fracture in the fracture length direction under the reservoir condition is drawn.

A method for experimentally determining the conductivity distribution of an acid-fractured fracture of a carbonate rock oil and gas reservoir comprises the following steps:

(2) simulating down-hole acid-fractured fracture extending and acid etching processes during acid fracturing by adopting a common acid fracturing simulator FracproPT, and acquiring fracture width distribution, fracture height distribution, temperature distribution and acid liquor mass concentration distribution data in a hydraulic fracture length direction; in the hydraulic fracture length direction, selecting fracture width, fracture height and temperature data of total 10 feature points with the acid liquor mass concentrations being 100%, 90%, 80%, 70%, 60%, 50%, 40%, 30%, 20%, 10% of the initial mass concentration;

(2) converting acid injection displacement of the oil field site scale into acid injection displacement of the laboratory scale according to a Reynolds number similarity criterion for fluid mechanics and in combination with the fracture height data of the 10 feature points in the step (1);

(3) preparing acid liquor of the 10 feature points used for an experiment according to the acid liquor mass concentration data of the 10 feature points in the step (1); and (4) simulating the acid etching process according to the temperatures and fracture widths corresponding to the 10 feature points in the step (1), the acid injection displacement of the 10 feature points in the step (2) and the flow described in the patent ZL201010203373.0 by using the acid liquor prepared in the step (3), experimentally testing the conductivity under the condition of reservoir closed pressure, and drawing a conductivity distribution diagram of an acid-etched fracture in the fracture length direction under the reservoir condition.

In the present invention, the step (1) of simulating down-hole acid-fractured fracture extending and acid etching processes during acid fracturing by adopting a common acid fracturing simulator FracproPT, and acquiring fracture width distribution, fracture height distribution, temperature distribution and acid liquor mass concentration distribution data in a hydraulic fracture length direction; in the hydraulic fracture length direction, selecting fracture width, fracture height and temperature data of total 10 feature points with the acid liquor mass concentrations being 100%, 90%, 80%, 70%, 60%, 50%, 40%, 30%, 20%, 10% of the initial mass concentration includes the following substeps:

4) introducing wellbore data, reservoir geological data, acid fracturing fluid data, and construction parameters of a well layer to be subject to acid fracturing into an acid fracturing simulator FracproPT, numerically calculating hydraulic fracture extending, acquiring fracture width, fracture height and temperature data in a hydraulic fracture length direction after preflush is injected, and drawing a distribution diagram of fracture width, fracture height and temperature. That is, wellbore data is input into a "Wellbore Configuration" module of the acid fracturing simulator FracproPT; reservoir stratum parameters are input into a "Reservoir Parameters" module; acid fracturing fluid data is input into a "Fluid & Proppant Selection" module; a preflush (fracturing fluid) pumping process is input into "Treatment Schedule"; temperature distribution, fracture width distribution and fracture height distribution in the fracture length direction of the hydraulic fracture after the fracturing fluid is injected are numerically simulated and calculated, and a distribution diagram in the fracture length direction is drawn;

5) adding an acid liquor pumping process to "Treatment Schedule" based on a model in the step 1), numerically simulating and calculating an acid etching process of the hydraulic fracture, acquiring the distribution of the acid liquor mass concentration in the fracture length direction, and drawing an acid liquor mass concentration distribution diagram; and 6) selecting corresponding fracture lengths of 10 feature points with the acid liquor mass concentrations being 100%, 90%, 80%, 70%, 60%, 50%, 40%, 30%, 20%, 10% of the initial mass concentration from the acid liquor mass concentration distribution diagram in the step 2), and reading fracture width, fracture height and temperature data from the temperature distribution diagram, the fracture width distribution diagram and the fracture height distribution diagram in the step 1) according to the corresponding fracture lengths.

In the present invention, the step of converting acid injection displacement of the oil field site scale into acid injection displacement of the laboratory scale according to a Reynolds number similarity criterion for fluid mechanics in the step (2) and in combination with the fracture height data of the 10 feature points in the step (1) comprises the following contents:

the flow velocity i of the hydraulic fracture at any position (Yingchuan Li, Oil Production Engineering (Second Edition) [M], Beijing: Petroleum Industry Press, 278-279) is:

$$U_i = \frac{Q}{120 W_i H_i}; \tag{1}$$

according to the fluid mechanics, the Reynolds number in the hydraulic fracture is:

$$N_{Re,i} = \frac{W_i \rho U_i}{\mu}; \tag{2}$$

by substituting (1) into the formula (2), the Reynolds number in the hydraulic fracture is obtained as below:

$$N_{Re,i} = \frac{\rho Q}{120\ \mu H_i}; \tag{3}$$

in the same way, the Reynolds number in the hydraulic fracture of the laboratory scale can be obtained as below:

$$\eta_{Re,i} = \frac{\rho q}{120\ \mu h}; \tag{4}$$

According to the Reynolds number similarity, there is:

$$n_{Re,i} = N_{Re,i} \tag{5}$$

the acid liquor system used for an experiment is an acid liquor system used in the oil field site, so the density and viscosity are unchanged, and the acid injection displacement q of the laboratory scale can be obtained in combination with formulas (3)-(5):

$$q = \frac{Q h}{H_i}; \tag{6}$$

in the formula: Q is an acid injection displacement on site, m³/min; Ui is a flow velocity of acid liquor at any location i in the acid-fractured fracture, m/s; Wi is a fracture width at any location i in the acid-fractured fracture, m; Hi is a fracture height at any point i in the acid-fractured fracture, m; ρ is an acid liquor density, kg/m³; μ is an acid liquor viscosity, Pa·s; $N_{Re,i}$ is a Reynolds number in the acid-fractured fracture, no dimension; q is an experimental acid injection displacement, L/min; h is an experimental rock plate width, mm; $n_{Re,i}$ is a Reynolds number in the experimentally simulated fracture, no dimension.

The acid injection displacement of the laboratory scale at different feature points may be determined from formula (6) in combination with the fracture height distribution data in the step (1).

In the present invention, in the step (3), the step of preparing acid liquor of the 10 feature points used for an experiment according to the acid liquor mass concentration data of the 10 feature points in the step (1) comprises the following contents:

1) the volume of the prepared acid is determined. The volume of acid liquor required in an experiment is calculated according to formula (7):

$$V_1 = \frac{qV}{Q}; \qquad (7)$$

in the formula: $V_1$ is the amount of the experimentally prepared acid, L; V is the acid injection amount on the oil field site, m³.

The actual amount of acid required for the experiment is increased by 20% in accordance with the calculation result of formula (7).

3) Fresh acid (free of a resultant of acid-rock reaction) having an acid liquor mass concentration of a feature point is prepared, and $CaCl_2$ and $MgCl_2$ generated by a reaction between acid and rock when the acid liquor is added till the initial mass concentration is reduced to the acid liquor mass concentration of the feature point are added, then sufficiently mixed and uniformly stirred, thereby forming an acid liquor system in the downhole acid-fractured fracture. The amounts of $CaCl_2$ and $MgCl_2$ added are calculated according to the following formulas:

for a limestone stratum, the mass fraction of $CaCl_2$ in the acid liquor is:

$$w_{CaCl_2} = \frac{55.5(C_o - C_i)}{36.5 + 28C_i}; \qquad (8)$$

the mass of $CaCl_2$ added for experimentally preparing a certain amount of residual acid is:

$$m_{CaCl_2} = \frac{w_{CaCl_2}V_1(0.5C_i + 1)}{1 - w_{CaCl_2}}; \qquad (9)$$

for a dolomite stratum, the mass fraction of $CaCl_2$ in the acid liquor is:

$$w_{CaCl_2} = \frac{27.75(C_o - C_i)}{36.5 + 24C_i}; \qquad (10)$$

the mass fraction of $MgCl_2$ in the acid liquor is:

$$w_{MgCl_2} = \frac{23.75(C_o - C_i)}{36.5 + 24C_i}; \qquad (11)$$

the mass of $MgCl_2$ added for experimentally preparing a certain amount of the residual acid is:

$$m_{MgCl_2} = \frac{w_{MgCl_2}V_1(0.5C_i + 1)}{1 - w_{MgCl_2}}; \qquad (12)$$

the mass of $CaCl_2$ added for experimentally preparing a certain amount of residual acid is calculated according to formula (9).

In the formula: $W_{CaCl2}$, $W_{MgCl2}$ are mass fractions of $CaCl_2$ and $MgCl_2$ in acid liquor, decimals; $C_o$, $C_i$ are the initial mass concentrations of the acid liquor, and the acid liquor mass concentration at any position i in the acid-fractured fracture, decimals; $m_{CaCl2}$, $m_{MgCl2}$ are the mass of $CaCl_2$ and the mass of $MgCl_2$ added for preparing acid liquor with a volume of $V_1$, kg.

In the present invention, in the step (4), the acid etching process is simulated according to the corresponding temperatures and fracture widths of the 10 feature points in the step (1), the acid injection displacement of the 10 feature points in the step (2) and the flow described in the patent ZL201010203373.0 by using the acid liquor prepared in the step (3), the conductivity under the condition of reservoir closed pressure is experimentally tested, and a conductivity distribution diagram of an acid-etched fracture in the fracture length direction under the reservoir condition is drawn. That is, the acid etching process is physically simulated according to the temperature, fracture width, acid liquor mass concentration and experimental acid injection displacement of the 10 feature points and the flow described in the patent ZL201010203373.0, the conductivity under the condition of reservoir closed pressure is experimentally tested, and a conductivity distribution diagram is drawn according to the position of the testing feature point in the fracture length direction.

Compared with the prior art, the present invention provides a method for experimentally determining the conductivity distribution of an acid-fractured fracture of a carbonate rock oil and gas reservoir. This method is based on the similarity criterion for fluid mechanics. 10 features points of the hydraulic fracture in the fracture length direction are selected in combination with the simulation results of the acid fracturing simulator, and the conductivity of the 10 feature points is tested, and therefore the method achieves the conductivity testing of an acid-etched fracture in the entire fracture length direction, breaks through the limitation of the traditional experimental scale, and is conducive to the real evaluation of the conductivity distribution of an underground acid-fractured fracture and the improvement of the acid fracturing modification effect of the carbonate rock oil and gas reservoir.

DETAILED DESCRIPTION OF THE EMBODIMENTS

Figure 1:
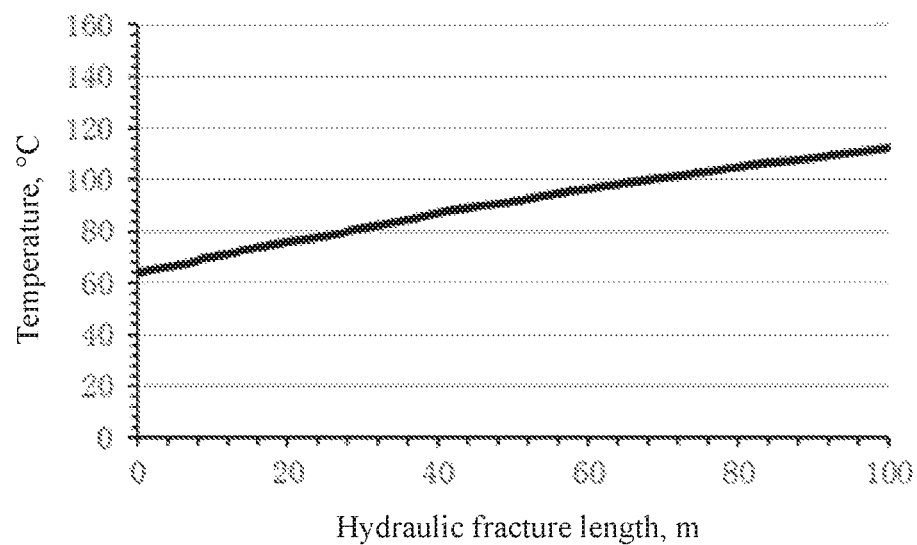
FIG. 1 is a temperature distribution diagram of an X well in a fracture length direction of a hydraulic fracture in the present invention.
Figure 2:
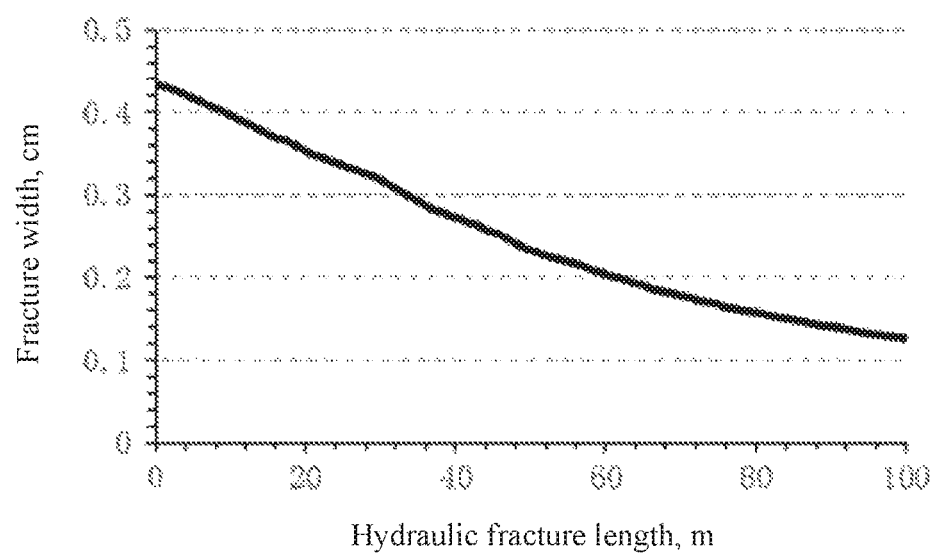
FIG. 2 is a fracture width distribution diagram of the X well in the fracture length direction of the hydraulic fracture in the present invention.
Figure 3:
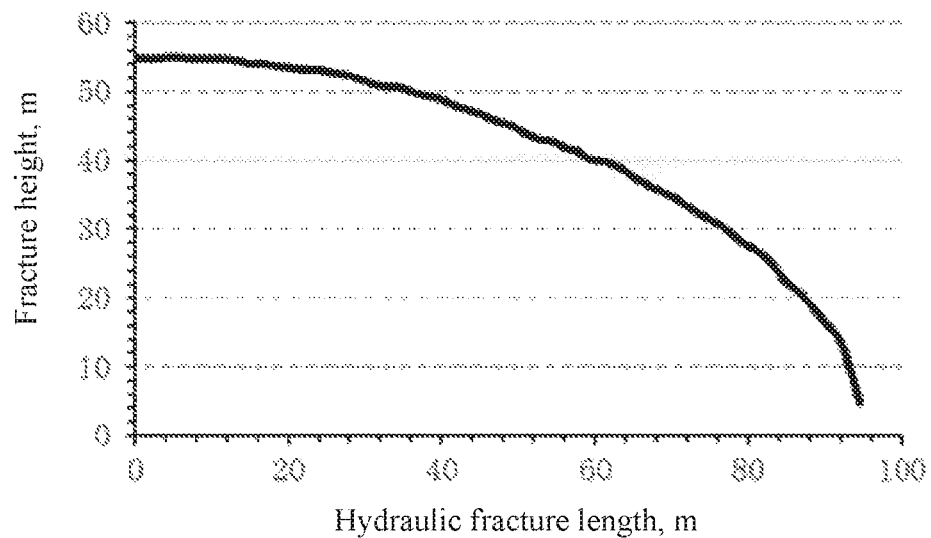
FIG. 3 is a fracture height distribution diagram of the X well in the fracture length direction of the hydraulic fracture in the present invention.

The accompanying drawings and application examples are used for further describing the present invention below and are intended to illustrate and explain the present invention, without limiting the scope of the present invention. Details are as follows:

(2) simulating down-hole acid-fractured fracture extending and acid etching processes during acid fracturing by adopting a common acid fracturing simulator FracproPT, and acquiring fracture width distribution, fracture height distribution, temperature distribution and acid liquor mass concentration distribution data in a hydraulic fracture length direction; in the hydraulic fracture length direction, selecting fracture width, fracture height and temperature data of total 10 feature points with the acid liquor mass concentrations being 100%, 90%, 80%, 70%, 60%, 50%, 40%, 30%, 20%, 10% of the initial mass concentration;

4) introducing wellbore data, reservoir geological data, acid fracturing fluid data, and construction parameters of a well layer to be subject to acid fracturing into an acid fracturing simulator FracproPT, numerically calculating hydraulic fracture extending, and acquiring temperature distribution, fracture width distribution and fracture height distribution in a hydraulic fracture length direction after preflush is injected. Taking an X well to be subject to acid fracturing in a carbonate rock gas field in the Sichuan Basin as an example, wellbore data is input into a "Wellbore Configuration" module of the acid fracturing simulator FracproPT; reservoir stratum parameters are input into a "Reservoir Parameters" module; acid fracturing fluid data is input into a "Fluid & Proppant Selection" module; a preflush (fracturing fluid) pumping process (see Table 1) is input into "Treatment Schedule"; temperature distribution, fracture width distribution and fracture height distribution in the fracture length direction of the hydraulic fracture after the fracturing fluid is injected are numerically simulated and calculated, and a distribution diagram in the fracture length direction is drawn (see FIG. 1, FIG. 2 and FIG. 3).

TABLE 1

Simulated Input Parameters of Respective Modules during Acid Fracturing of X well

| | | |
|---|---|---|
| Wellbore Configuration | Sleeve | Outer diameter 127 mm, depth 5516 m |
| | Oil Pipe | Outer diameter 89 mm, depth 5382 m |
| | Perforated Interval | 5382.0-5406.0 m |
| | Perforation Number | 384 |
| Reservoir Parameters | Gas Reservoir Temperature (° C.) | 149 |
| | Target Stratum Lithology | Limestone |
| | Stress Gradient (MPa/m) | 0.0217 |
| | Permeability (mD) | 0.5 |
| | Young's Modulus (MPa) | 76000 |
| | Poisson's Ratio | 0.3 |
| | Reaction Order | 1.7525 |
| | Reaction Rate Constant | $4.1610 \times 10^{-6}$ |
| Fluid & Proppant Selection | Preflush Flow State Coefficient | 0.5655 |
| | Preflush Consistency Coefficient | 1.5631 |
| | Gelled Acid Flow State Coefficient | 0.587 |
| | Gelled Acid Consistency Coefficient | 0.162 |
| Treatment Schedule | Preflush (m³) | 320 |
| | Acid Liquor (m³) | 320 |
| | Displacement Fluid (m³) | 20.8 |
| | Displacement (m³/min) | 4.0 |

Figure 4:
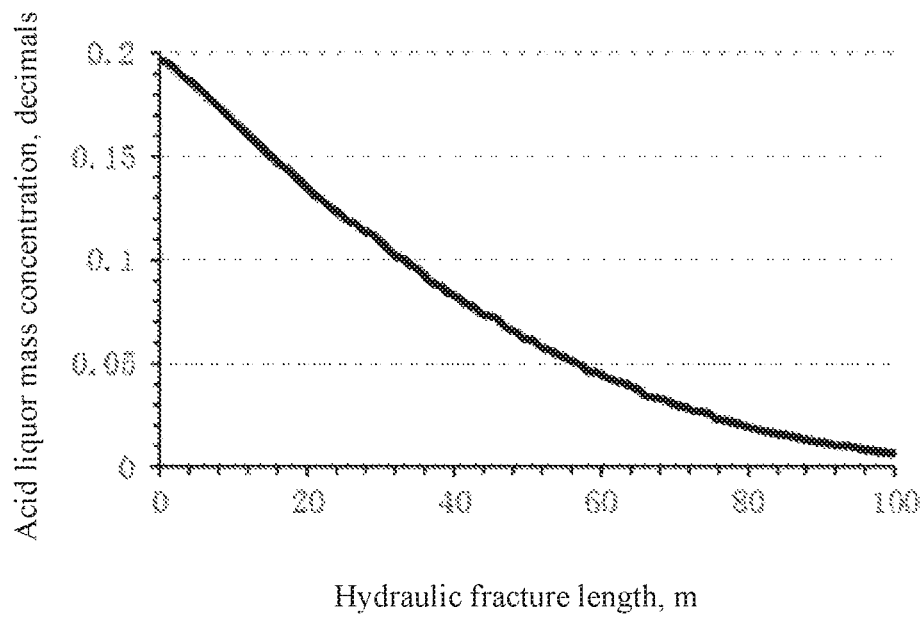
FIG. 4 is an acid liquor mass concentration distribution diagram of the X well in the fracture length direction of the hydraulic fracture in the present invention.
Figure 5:
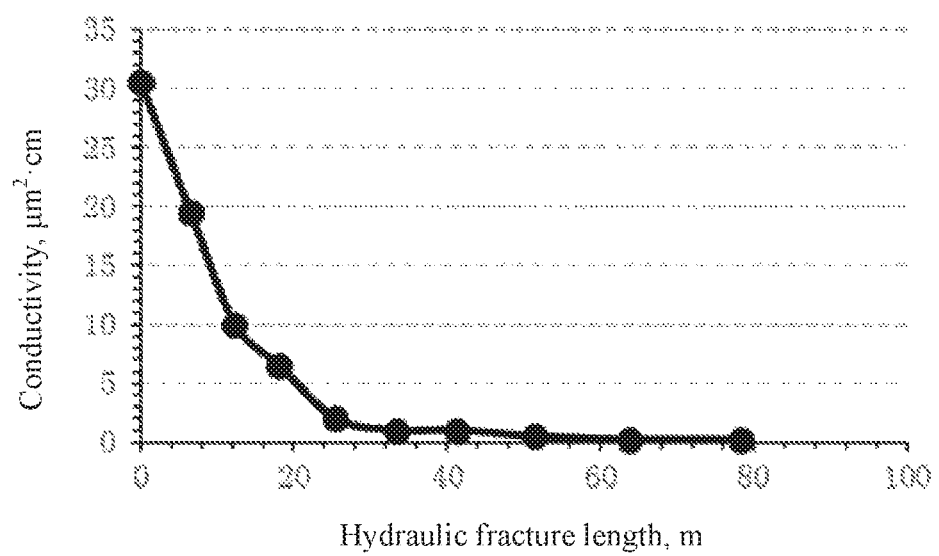
FIG. 5 is a conductivity distribution diagram of the X well in the fracture length direction of the hydraulic fracture in the present invention.

5) adding an acid liquor pumping process to "Treatment Schedule" based on a model in the step 1), numerically simulating and calculating an acid etching process of a hydraulic fracture, acquiring the distribution of the acid liquor mass concentration in the fracture length direction, and drawing an acid liquor mass concentration distribution diagram. The amount and displacement of acid liquor in Table 1 are input into the "Treatment Schedule". The acid etching process is simulated. The distribution diagram of the acid liquor mass concentration in the fracture length direction (see FIG. 4) is acquired;

6) selecting corresponding fracture lengths of 10 feature points with the acid liquor mass concentrations being 100%, 90%, 80%, 70%, 60%, 50%, 40%, 30%, 20%, 10% of the initial mass concentration on the acid liquor mass concentration distribution diagram of the step 2), and reading fracture width, fracture height and temperature data (see Table 2) from the temperature distribution diagram, the fracture width distribution diagram and the fracture height distribution diagram in the step 1) according to the corresponding fracture lengths;

TABLE 2

Basic Data of 10 Feature Points of X Well in Acid-fractured Facture Length Direction

| $C_i/C_o$ | Acid Liquor Mass Concentration (decimals) | Fracture Length (m) | Fracture Height (m) | Temperature (° C.) | Fracture Width (cm) | Experimental Acid Injection Displacement (L/min) | Acid Injection Volume (L) | Mass Fraction of Calcium Chloride (decimals) | Addition Amount of Calcium Chloride |
|---|---|---|---|---|---|---|---|---|---|
| 100% | 0.2 | 0 | 54.94 | 64.2 | 0.43 | 2.8 | 265.6 | 0.00 | 0.00 |
| 90% | 0.18 | 6.5 | 55 | 67.6 | 0.41 | 2.8 | 265.3 | 0.03 | 7.94 |
| 80% | 0.16 | 12.3 | 54.73 | 71.4 | 0.38 | 2.8 | 266.6 | 0.05 | 16.49 |
| 70% | 0.14 | 18.1 | 53.73 | 75 | 0.36 | 2.8 | 271.6 | 0.08 | 26.09 |
| 60% | 0.12 | 25.4 | 52.82 | 78.4 | 0.33 | 2.9 | 276.3 | 0.11 | 36.71 |
| 50% | 0.1 | 33.4 | 50.71 | 83.1 | 0.3 | 3.0 | 287.8 | 0.14 | 49.69 |
| 40% | 0.08 | 41.3 | 47.92 | 88.1 | 0.27 | 3.2 | 304.5 | 0.17 | 65.75 |
| 30% | 0.06 | 51.4 | 43.95 | 92.3 | 0.23 | 3.5 | 332.0 | 0.20 | 87.38 |
| 20% | 0.04 | 63.8 | 38.85 | 98.2 | 0.2 | 3.9 | 375.6 | 0.24 | 118.37 |
| 10% | 0.02 | 78.3 | 28.69 | 104.3 | 0.16 | 5.3 | 508.6 | 0.27 | 189.58 |

(2) converting acid injection displacement of the oil field site scale into acid injection displacement of the laboratory scale according to a Reynolds number similarity criterion for fluid mechanics and in combination with the fracture height data of the 10 feature points in the step (1). The acid injection displacement of 10 feature points (see Table 2) is calculated according to formula (6) and data in Table 2;

(3) preparing acid liquor of the 10 feature points used for an experiment according to the acid liquor mass concentration data of the 10 feature points in the step (1). The amount of acid required for testing the 10 feature points is calculated according to formula (7), and the mass of $CaCl_2$ (see Table 2) required for the experiment is calculated in formula (8) and formula (9). Fresh acid (free of a resultant of acid-rock reaction) having an acid liquor mass concentration of a feature point is prepared, and $CaCl_2$ and $MgCl_2$ generated by a reaction between acid and rock when the acid liquor is added to the fresh acid having a feature concentration till the initial mass concentration is reduced to the feature acid liquor mass concentration of are added, then sufficiently mixed and uniformly stirred, thereby forming an acid liquor system in the downhole acid-fractured fracture; and (4) simulating the acid etching process according to the temperatures and fracture widths corresponding to the 10 feature points in the step (1), the acid injection displacement of the 10 feature points in the step (2) and the flow described in the patent ZL201010203373.0 by using the acid liquor prepared in the step (3), experimentally testing the conductivity under the condition of reservoir closed pressure, and drawing a conductivity distribution diagram of an acid-etched fracture in the fracture length direction under the reservoir condition (see Table 5).

The invention claimed is:

1. A method for experimentally determining a conductivity distribution of an acid-fractured fracture of a carbonate rock oil and gas reservoir, comprising the following steps:
   (1) simulating a down-hole acid-fractured fracture extending process and an acid etching process during an acid fracturing by adopting an acid fracturing simulator, and acquiring fracture width distribution data, fracture height distribution data, temperature distribution data and acid liquor mass concentration distribution data in a hydraulic fracture length direction; in the hydraulic fracture length direction, selecting fracture width data, fracture height data and temperature data of total 10 feature points with acid liquor mass concentrations being 100%, 90%, 80%, 70%, 60%, 50%, 40%, 30%, 20%, 10% of an initial mass concentration;
   (2) converting an acid injection displacement of an oil field site scale into an acid injection displacement of a laboratory scale according to a Reynolds number similarity criterion for fluid mechanics and in combination with the fracture height data of the 10 feature points in step (1);
   (3) preparing acid liquors of the 10 feature points used for an experiment according to the acid liquor mass concentrations of the 10 feature points in step (1); and
   (4) simulating the acid etching process according to the temperature data and fracture width data corresponding to the 10 feature points in step (1) and the acid injection displacement of the 10 feature points in step (2) by using the acid liquors prepared in step (3), testing a conductivity under a condition of a reservoir closed pressure, and drawing a conductivity distribution diagram of an acid-etched fracture in the hydraulic fracture length direction under the condition of the reservoir closed pressure.

2. The method for experimentally determining the conductivity distribution of the acid-fractured fracture of the carbonate rock oil and gas reservoir according to claim 1, wherein step (1) comprises:
   1) introducing wellbore data, reservoir geological data, acid fracturing fluid data, and construction parameters of a well layer to be subjected to the acid fracturing into the acid fracturing simulator, numerically calculating a hydraulic fracture extending, acquiring the fracture width data, the fracture height data and the temperature data in the hydraulic fracture length direction after a preflush is injected, and drawing a fracture width distribution diagram, a fracture height distribution diagram and a temperature distribution diagram;
   2) performing an acid liquor pumping process, numerically simulating and calculating an acid etching process of a hydraulic fracture, acquiring a distribution of the acid liquor mass concentrations in the hydraulic fracture length direction, and drawing an acid liquor mass concentration distribution diagram; and
   3) selecting the fracture length data of the 10 feature points with the acid liquor mass concentrations being 100%, 90%, 80%, 70%, 60%, 50%, 40%, 30%, 20%, 10% of the initial mass concentration on the acid liquor mass concentration distribution diagram, and reading the fracture width data, the fracture height data and the temperature data from the temperature distribution diagram, the fracture width distribution diagram and the fracture height distribution diagram in step 1) according to the fracture length data.

3. The method for experimentally determining the conductivity distribution of the acid-fractured fracture of the carbonate rock oil and gas reservoir according to claim 1, wherein the acid injection displacement of the laboratory scale in step (2) is determined by the following formula:

$$q = \frac{Qh}{H_i},$$

wherein q is the acid injection displacement of the laboratory scale, $mm^3/min$;
Q is the acid injection displacement of the oil field site scale, $m^3/min$;
$H_i$ is the fracture height data at a point i in the acid-fractured fracture, m;
h is an experimental rock plate width, mm; and
the acid injection displacements of the laboratory scale at different feature points are determined in combination with the fracture height distribution data in step (1).

4. The method for experimentally determining the conductivity distribution of the acid-fractured fracture of the carbonate rock oil and gas reservoir according to claim 1, wherein in step (3), the step of preparing each of the acid liquors of the 10 feature points for the experiment comprises the following steps:
   1) determining an amount of an experimentally prepared acid according to the formula:

$$V_1 = \frac{qV}{Q},$$

wherein $V_1$ is the amount of the experimentally prepared acid, L;

q is the acid injection displacement of the laboratory scale, L/min;

V is an amount of acid injection on an oil field site, m³;

Q is the acid injection displacement of the oil field site scale, m³/min; and 2) a fresh acid having an acid liquor mass concentration of a feature point is prepared, and $CaCl_2$ and $MgCl_2$ are generated by a reaction between acid and rock when the acid liquor is added to the fresh acid until the initial mass concentration is reduced to the acid liquor mass concentration of the feature point, then mixed and uniformly stirred, thereby forming an acid liquor system in a downhole acid-fractured fracture, wherein addition amounts of $CaCl_2$ and $MgCl_2$ are calculated according to the following formulas:

$$m_{CaCl_2} = \frac{w_{CaCl_2} V_1 (0.5 C_i + 1)}{1 - w_{CaCl_2}}$$

$$m_{MgCl_2} = \frac{w_{MgCl_2} V_1 (0.5 C_i + 1)}{1 - w_{MgCl_2}}$$

wherein $m_{CaCl_2}$ and $m_{MgCl_2}$ are respectively a mass of $CaCl_2$ and a mass of $MgCl_2$ added for preparing acid liquor with a volume of $V_1$, kg;

$w_{CaCl_2}$ and $w_{MgCl_2}$ are respectively a mass fraction of $CaCl_2$ and a mass fraction of $MgCl_2$ in the acid liquor, decimals; and $C_i$ is the acid liquor mass concentration at a position i in the acid-fractured fracture, decimals.

5. The method for experimentally determining the conductivity distribution of the acid-fractured fracture of the carbonate rock oil and gas reservoir according to claim 1, wherein step (4) comprises: physically simulating the acid etching process according to the temperature data, the fracture width data, the acid liquor mass concentrations and the acid injection displacement of the laboratory scale of the 10 feature points, experimentally testing the conductivity under the condition of the reservoir closed pressure, and drawing the conductivity distribution diagram according to a position of a testing feature point in the hydraulic fracture length direction.

* * * * *